(12) United States Patent
Shaffer et al.

(10) Patent No.: US 6,324,409 B1
(45) Date of Patent: *Nov. 27, 2001

(54) SYSTEM AND METHOD FOR OPTIMIZING TELECOMMUNICATION SIGNAL QUALITY

(75) Inventors: Shmuel Shaffer, Palo Alto; William J. Beyda, Cupertino, both of CA (US)

(73) Assignee: Siemens Information and Communication Systems, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,565

(22) Filed: Jul. 17, 1998

(51) Int. Cl.⁷ ............................... H04Q 7/24; H04B 1/00
(52) U.S. Cl. ............................................ 455/552; 455/436
(58) Field of Search .................................. 704/221, 229; 455/436, 552, 553

(56) References Cited

U.S. PATENT DOCUMENTS

| | | | |
|---|---|---|---|
| 5,408,419 | * 4/1995 | Wong | 709/221 |
| 5,546,395 | 8/1996 | Sharma et al. | 370/468 |
| 5,592,586 | 1/1997 | Maitra et al. | 704/220 |
| 5,602,961 | 2/1997 | Kolesnik et al. | 704/223 |
| 5,608,776 | * 3/1997 | Lev et al. | 455/436 |
| 5,701,390 | 12/1997 | Griffin et al. | 704/206 |
| 5,729,655 | 3/1998 | Kolesnik et al. | 704/223 |
| 5,742,773 | 4/1998 | Brown et al. | 709/228 |
| 5,742,930 | 4/1998 | Howitt | 704/502 |
| 5,903,862 | * 5/1999 | Weaver, Jr. et al. | 704/212 |
| 5,956,673 | * 9/1999 | Weaver et al. | 704/221 |
| 6,006,091 | * 12/1999 | Lupien | 455/435 |
| 6,108,560 | * 8/2000 | Navaro et al. | 455/517 |

OTHER PUBLICATIONS

Harry Newton, Newton's Telecom Dictionary, 10th edition, Flatiron Publishing, Inc., p. 468, 470, 619, 620, and 1050–1053, Feb. 1996.*

* cited by examiner

Primary Examiner—Tālivaldis Ivars Šmits (57) ABSTRACT

An embodiment of the present invention provides a system and method for selecting voice compression and coding based on capabilities of all intermediary networks and links in addition to the capabilities of the end points. The present invention optimizes voice quality by determining a minimum number of new conversions, herein referred to as transcodings, necessary in voice connections, on a system wide basis. According to an embodiment of the present invention, a sender sends a signaling message to a receiver. The signaling message is sent to the receiver prior to sending an actual message. Each entity or device capable of converting voice coding, herein referred to as a "station", between the sender and the receiver identifies its capabilities to the signaling message. The receiver, which is also a station, also identifies its capabilities to the signaling message. The signaling message may then be sent back to the sender for the sender to determine an optimized series of voice codings to be used for the call. Alternatively, the call receiver, or an intermediate station located along the call route, may determine the optimized series of voice codings to be used for the call and communicate to the caller how the call should be coded.

34 Claims, 8 Drawing Sheets

SYSTEM AND METHOD FOR OPTIMIZING TELECOMMUNICATION SIGNAL QUALITY

FIELD OF THE INVENTION

The present invention relates to telecommunication call transmissions. In particular, the present invention relates to a system and method for selecting voice coding at various junctions in a telecommunication call.

BACKGROUND OF THE INVENTION

With the proliferation of voice over data network technology has come the deployment of numerous voice coding and compression algorithms. Examples of these voice coding and compression algorithms include G.723, Global System for Mobil Communication (GSM), Pulse Code Modulation (PCM), G.711, and Adaptive Differential Pulse Code Modulation (ADPCM). G.723, PCM, G.711, and ADPCM are protocols which are defined by the International Telecommunications Union (ITU), and are well known to those reasonably skilled in the art. GSM is a protocol defined by European Telecommunication Standards Institute and is also well known to those reasonably skilled in the art. These protocols seek to compress and/or code a voice signal into an optimal number of bits for transmission over a data network, attempting to balance quality of service with affordability.

Protocols currently exist which allow two users on the same local access network, for example, to set up an optimal connection. A telephony feature server (TFS) may determine the coding abilities of each of the clients and find the best choice for the connection. However, when users are on a wide area network (WAN), separate local area networks (LANs), or there are intermediate public network connections, the ability to perform optimal connection negotiation on a system wide basis is typically lost. When users are part of such systems, it can result in multiple coding and compression algorithms used throughout a connection, resulting in gross distortion and loss of voice quality. The resulting signal distortion and loss of quality typically make the circuit unsuitable for fax or computer modem connection. Further, a call is often connected to a voice mail system, using an entirely different coding algorithm from a live call, which can further add to the resulting distortion.

For example, assume a telephony over LAN (TOL) system in which a caller making a call has several compression options. In this example, assume that a call from the caller is set up using a compression algorithm defined by G.723. Assume also that the caller is connected to an Ethernet LAN, which has a TOL gateway X. The call may be received by gateway X and converted to pulse code modulation (PCM) coding. From gateway X to a second gateway, gateway Y, the call is transmitted in PCM coding. Assume also that the call receiver is connected to gateway Y and that the receiver only has GSM capabilities currently available. Accordingly, the call is then converted from PCM coding to GSM coding.

Typically, there may be multiple compression coding options that may be selected for use between the caller and gateway X. However, the coding selection is typically only an educated guess since there is typically no prior knowledge of the capabilities of the receiver. In this example, the voice compression of G.723 introduces a first distortion. When the coded G.723 voice arrives at gateway X, it is then converted to PCM voice. At this point, a second distortion is introduced due to the G.723 decompression and PCM coding. When the PCM voice arrives at gateway Y, gateway Y negotiates with the call receiver and determines that GSM is the only option. Accordingly, a third distortion is introduced when the connection is made to the call receiver using GSM. It is not necessarily the severity of the individual compressions, but the transcoding back and forth and back again to different compression methods that typically causes unnecessary signal distortion.

The resulting signal in this example is substantially more distorted than a signal produced by a single family of coding algorithms. The various conversions produced a suboptimal series of events on a system wide basis, even though each point-to-point decision may have been optimal. It would be desirable to produce a series of connections which optimizes overall quality of the transmission from the sender to the receiver. The present invention addresses such a need.

SUMMARY OF THE INVENTION

An embodiment of the present invention provides a system and method for selecting voice compression and coding based on capabilities of all intermediary networks and links in addition to the capabilities of the end points. The present invention optimizes voice quality by determining a minimum number of new conversions, herein referred to as transcodings, necessary in voice connections, on a system wide basis. According to an embodiment of the present invention, a sender sends a signaling message to a receiver. The signaling message is sent to the receiver prior to sending an actual message. Each entity or device capable of converting voice coding between the sender and the receiver identifies their capabilities to the signaling message. An entity or device, including end devices as well as intermediary devices (such as gateways), capable of converting voice coding between a sender and a receiver is herein referred to as a "station". The receiver also identifies its capabilities to the signaling message. The signaling message may then be sent back to the sender for the sender to determine an optimized series of voice coding to be used for the call. Alternatively, the call receiver, or an intermediate station located along the call route, may determine the optimized series of voice coding to be used for the call and communicate to the caller how the call should be coded.

According to an embodiment of the present invention, the sender may maintain a prioritized list of preferred coding methods. Each coding method included in the prioritized list of preferred coding methods are compared with the capabilities of all the stations to determine if all the stations have the capability to perform each of the preferred coding. It is also determined whether the transmission from the sender to the receiver can be sent with only uncompressed codes and a single preferred coding method. These determinations are made for each preferred coding method of the sender. The results are stored and analyzed. If there is a result which allows transmission from the sender to the receiver with no transcoding, then that result is selected. Otherwise, the result with the minimum number of transcodings is selected. If there is a tie in the results, then the result with the most number of hops with compressed coding is selected. A hop is a telecommunication signal coded section between two stations. If there is a tie with the result with the most number of hops with compressed coding, then the result which is higher on the sender's preference list is selected. Each network or link is then instructed to use a coding method which has been predetermined by the selected result. Note that although a specific order is described herein for exemplary purposes, the various resolutions of the ties may be performed in any order.

A method according to an embodiment of the present invention for optimizing telecommunication signal quality is presented. The method comprising steps of sending a signaling message; collecting at least one capability of at least one station that interacts with the signaling message; and determining a coding scheme based on the at least one collected capability.

In another aspect of the present invention, a system according to an embodiment of the present invention for optimizing telecommunication signal quality is presented. The system comprising a telecommunication device configured to send a signaling message to a receiving location. The signaling message collects at least one capability of at least one station that interacts with the signaling message. The system also includes a processor coupled with the telecommunication device configured to determine a coding scheme based on the at least one collected capability.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiments shown but is to be accorded the widest scope consistent with the principles and features described herein.

For simplicity, the examples herein refer to a telephone call, however, embodiments of the present invention are not limited to a call using a telephone. Rather, the call may be any telecommunication call. A telecommunication call is herein meant to include a call using a telephone, a cellular phone, a computer system, a video conferencing system, or any other voice or image communication means. Additionally, a caller is not limited to a person. A caller may be any entity, or device or program representing an entity, that can cause a telecommunication call to occur. Further, examples herein often refer to voice coding, however, the present invention may include any telecommunication signal coding, such as fax, and modem transmissions.

Figure 1:
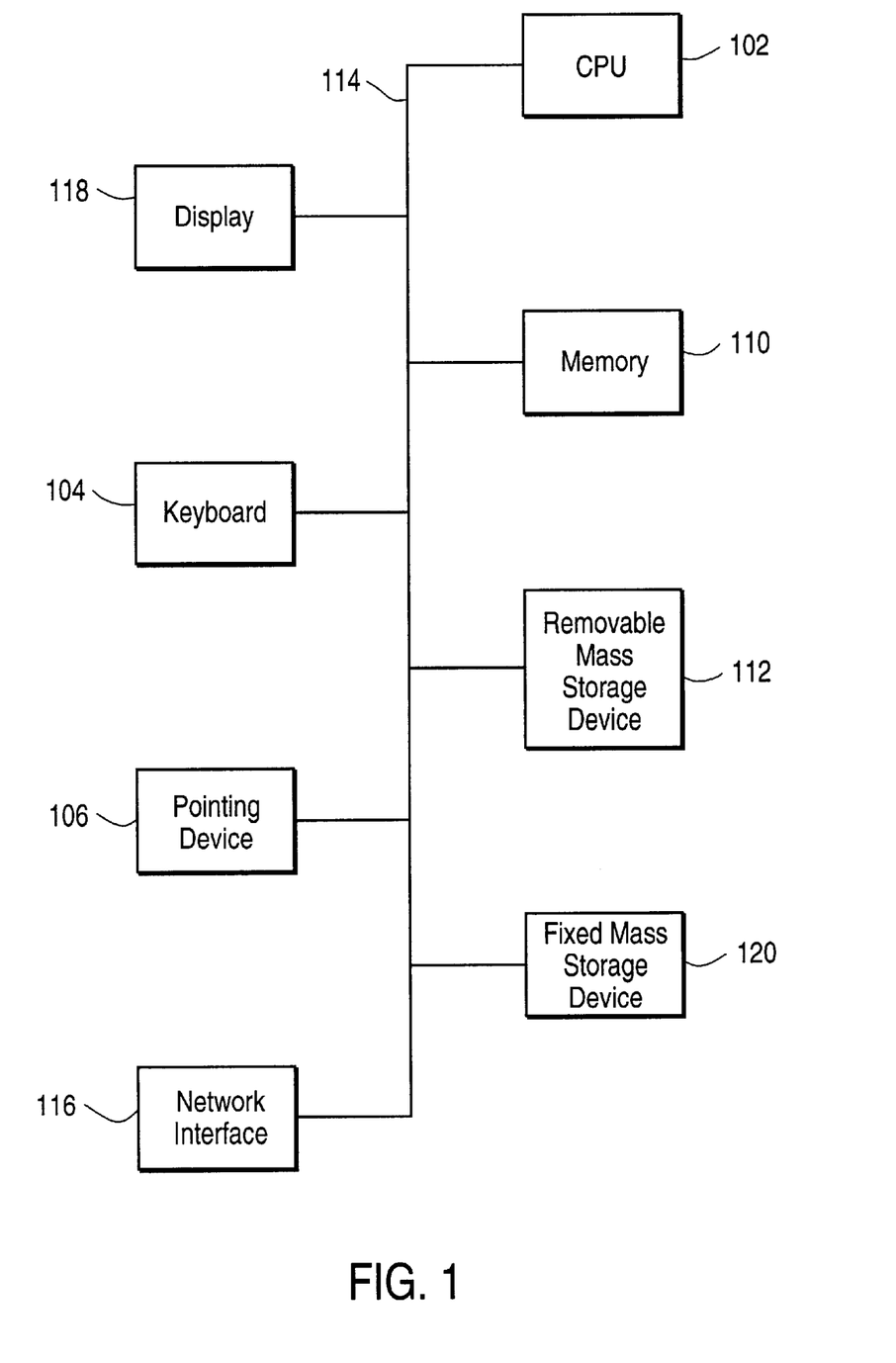
FIG. 1 is a block diagram of a computer system which is suitable for implementing the present invention.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, bus 114 is illustrative of any interconnection scheme serving to link the subsystems. The computer system shown in FIG. 1 is but an example of a computer system suitable for use with the invention. Other computer architectures having different configurations of subsystems may also be utilized.

Figure 2:
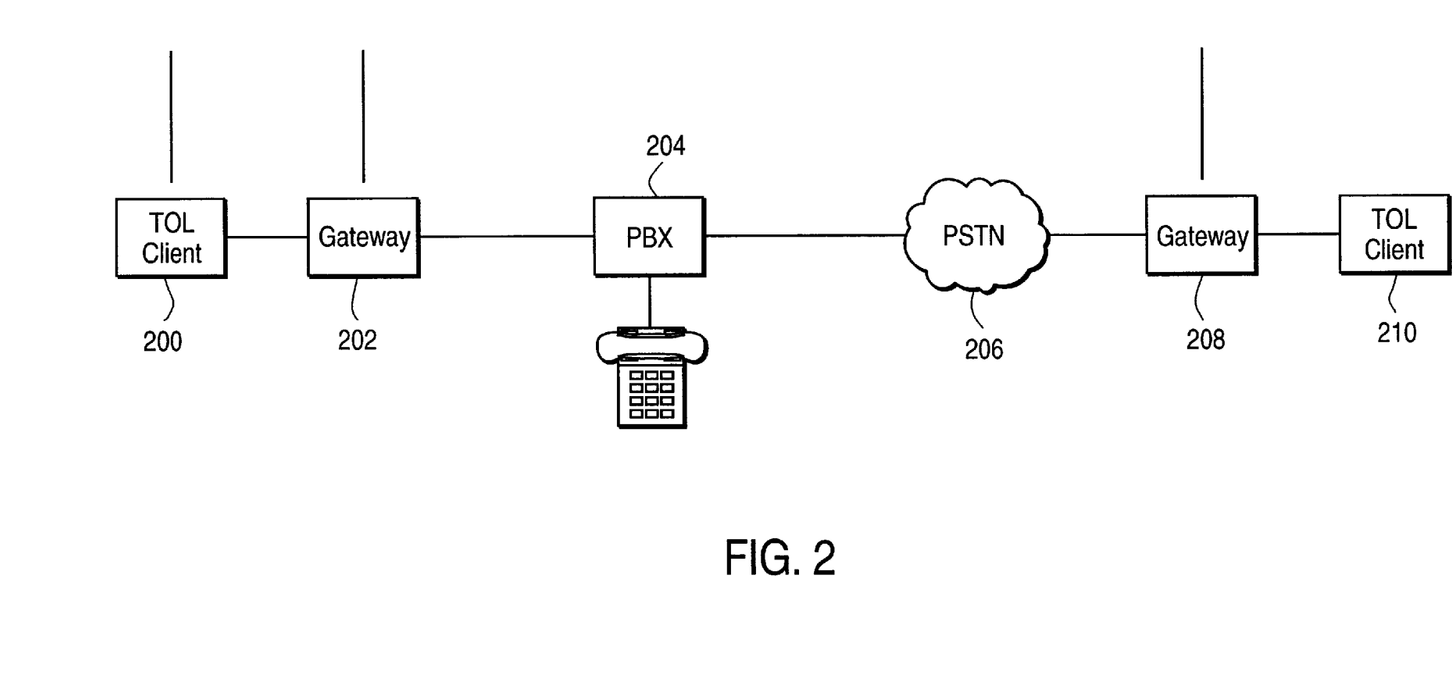
FIG. 2 is a block diagram of an example of a telephony over local area network (LAN) system which is suitable for implementing the present invention.

FIG. 2 is a block diagram of a telephony over local area network (LAN) (TOL) system suitable for implementing the present invention. The system shown in FIG. 2 includes a TOL client 200 coupled with a gateway 202, which in turn is also coupled with a private branch exchange (PBX) 204. PBX 204 is a telecommunications switching system, typically owned by a telecommunications customer, that acts as an in-house central office substitute with advanced features and capabilities. PBX 204 acts as an interface for telephones, terminals and other equipment. PBX 204 is also shown to be coupled with a public switched telephone network (PSTN) 206. PSTN 206 is also shown to be coupled with a second gateway 208, which in turn is coupled with another TOL client 210.

The system shown in FIG. 2 shows two locations, gateway 202 and gateway 208, wherein a new conversion, herein referred to as "transcoding", may take place. For example, client 200 may send voice signals in G.723 compressed voice to gateway 202. At gateway 202, the G.723 compressed voice may be transcoded into pulse code modulation (PCM) digitized voice and sent through PBX 204 and into PSTN 206. In this example, the PCM compressed voice then reaches gateway 208 and is again converted into GSM voice.

Figure 3:
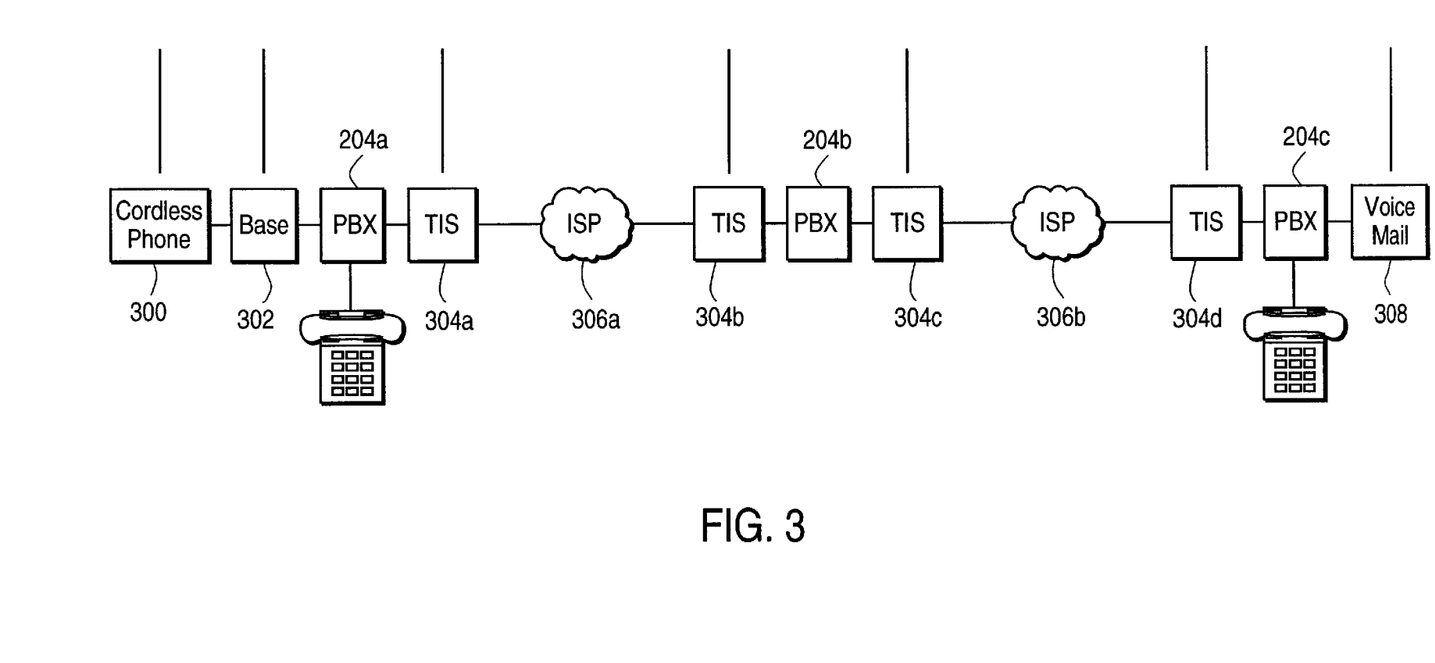
FIG. 3 is a block diagram of a modem telephone network system suitable for implementing the present invention.

FIG. 3 shows a block diagram of a modern network which shows at least six different possible transcoding locations. The network shown in FIG. 3 is also an example of a system suitable for implementing the present invention. In this example, the system includes PBXs 204A–204C at various sites, for instance San Francisco, Chicago, and New York. At one end of the connections, a TOL client is employing a voice mail system 308. At another end of the connection is a cordless telephone 300 with telephone base 302.

Rather than interconnecting PBX 204A–204C with PSTN leased lines, this system uses Telephony Internet Server (TIS) 304A–304D connections through Internet service providers (ISPs) 306A–306B, perhaps to reduce costs. Examples of TISs include TIS manufactured by Siemens Corp. and TIS manufactured by Vienna Systems. Examples of ISPs include Netcom, AT&T, and MCI.

Conventionally, an example of a likely transcoding scenario may be the transmission of voice in GSM compressed form from cordless telephone 300 to its base 302. At base 302, the GSM voice may be transcoded into PCM voice and transmitted through PBX 204A to TIS 304A. At TIS 304A, the PCM voice may again be transcoded into G.711 or G.723 voice, sent via ISP 306A to a second TIS 304B. At TIS 304B, the voice may again be transcoded into PCM voice and transmitted through PBX 204B to a third TIS 304C. At TIS 304C, the PCM voice may again be transcoded to G.711 or G.723 and sent through ISP 306B to TIS 304D. At TIS 304D, the voice may again be transcoded to PCM voice and sent through PBX 204C into voice mail system 308 which may need to transcoded PCM voice into ADPCM for recording into system 308. In this example, every transcoding introduces a further distortion.

The examples discussed in conjunction with FIGS. 2 and 3 illustrate how heavy distortions can be introduced during voice transmission. Although the voice conversions may have been optimal at each point of conversion, the totality of conversions may often not be optimal for a given call. It would be desirable to optimize the voice quality in a call. The present invention addresses such a need.

Figure 4:
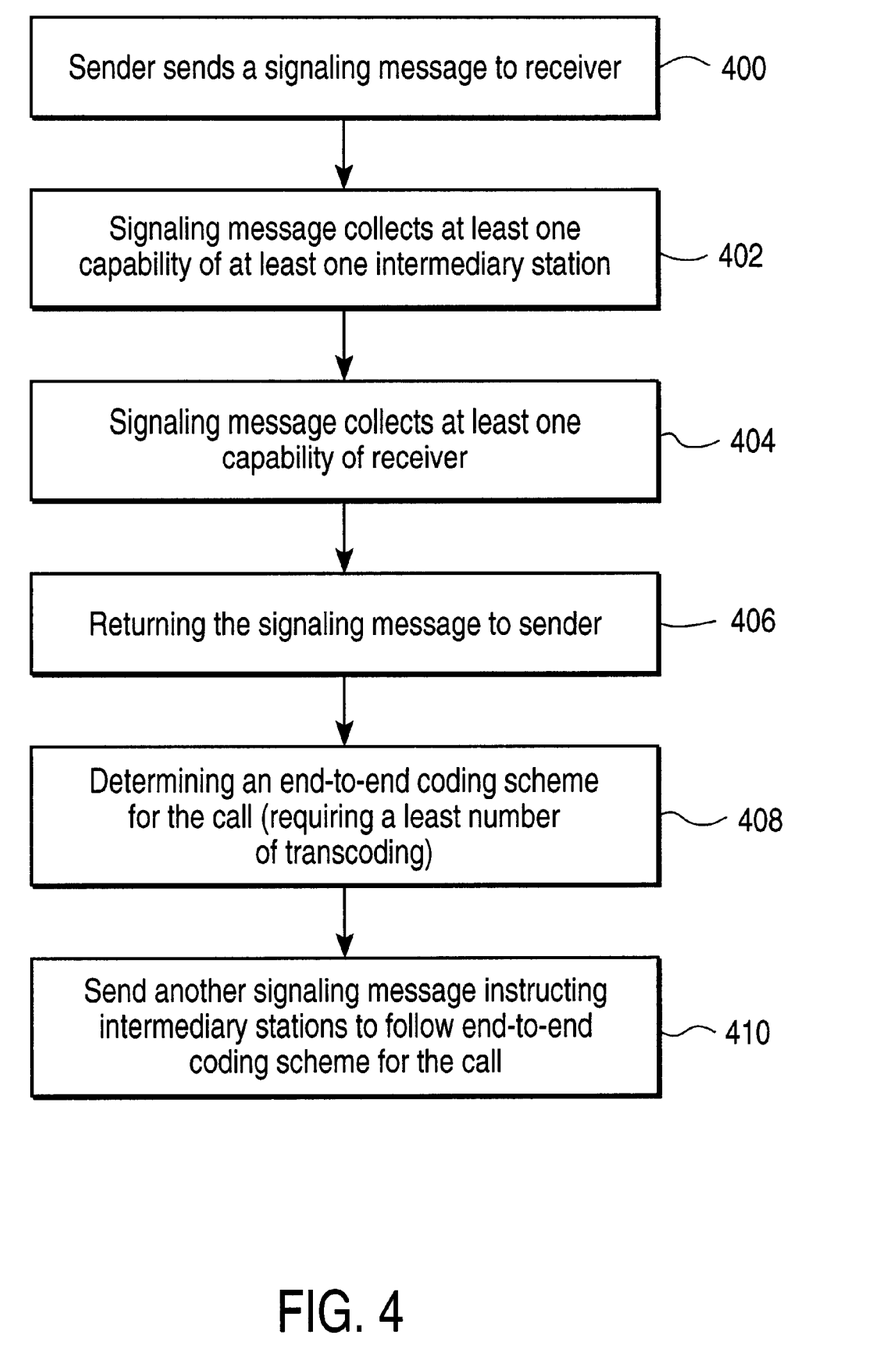
FIG. 4 is a flow diagram of a method according to an embodiment of the present invention for optimizing telecommunication signal quality.

FIG. 4 is a flow diagram of a method according to an embodiment of the present invention for optimizing voice quality in a call between a sender and a receiver. The sender sends a signaling message to a receiver, via step 400. A signaling message may be any user signaling field that may be used to send data. Examples of signaling messages include an integrated services digital network (ISDN) signaling message, such as a user-to-user signal, or an Internet protocol (IP) packet. User-to-user signals may be used at the beginning of a call setup between parties to send a message between end parties. An example of one particular use of a user-to-user signal is proprietary signaling. The protocol for ISDN signaling messages are defined by the International Telecommunications Union (ITU). These signaling messages are well known to those reasonably skilled in the art.

According to an embodiment of the present invention, the signaling message then collects at least one telecommunication signal coding or compression capability of at least one intermediary station (step 402). Preferably, all telecommunication signal coding and compression capability of all the intermediary stations are collected. Examples of intermediary stations include gateways 202 and 208 of FIG. 2 and base 302, TIS 304A–304D, and voice mail system 308 of FIG. 3. Station is herein meant to include any devices, gateways, networks, receiving devices (receiver), and any other points in the connection between the sender and the receiver wherein a telecommunication signal coding conversion may occur. When the signaling message collects capabilities of a station, the station may list its capabilities onto the signaling message.

The signaling message then collects at least one capability of the receiver (step 404). The signaling message preferably collects all of the telecommunication signal coding and compression capability of the receiver. In the examples shown in FIGS. 2 and 3, the receiver may be client 210 or voice mail system 308.

The signaling message is then returned to the sender (step 406) and an end-to-end coding scheme is then determined for the call (step 408). Preferably, the end-to-end coding scheme which is determined for the call requires a least number of transcodings during the transmission of the call. "End-to-end" is herein meant to include all, or any portion, of the entire connection between a receiver and sender. Preferably, the end-to-end coding scheme includes all stations within the call.

Alternatively, the end-to-end coding scheme may be determined approximately at the receiver's location. If the end-to-end coding scheme is determined approximately at the receiver's location, then step 406 is skipped. The end-to-end compression scheme may then be communicated to the sender through another signaling message. Another alternative is for the coding scheme to be determined by an intermediate station.

After the end-to-end coding scheme is determined, another signaling message is sent which instructs the intermediary stations to follow the end-to-end coding scheme (step 410). Accordingly, all the connections in a call may work together to produce an optimal end-to-end series of conversions resulting in optimal telecommunication signal quality.

Figure 5A:
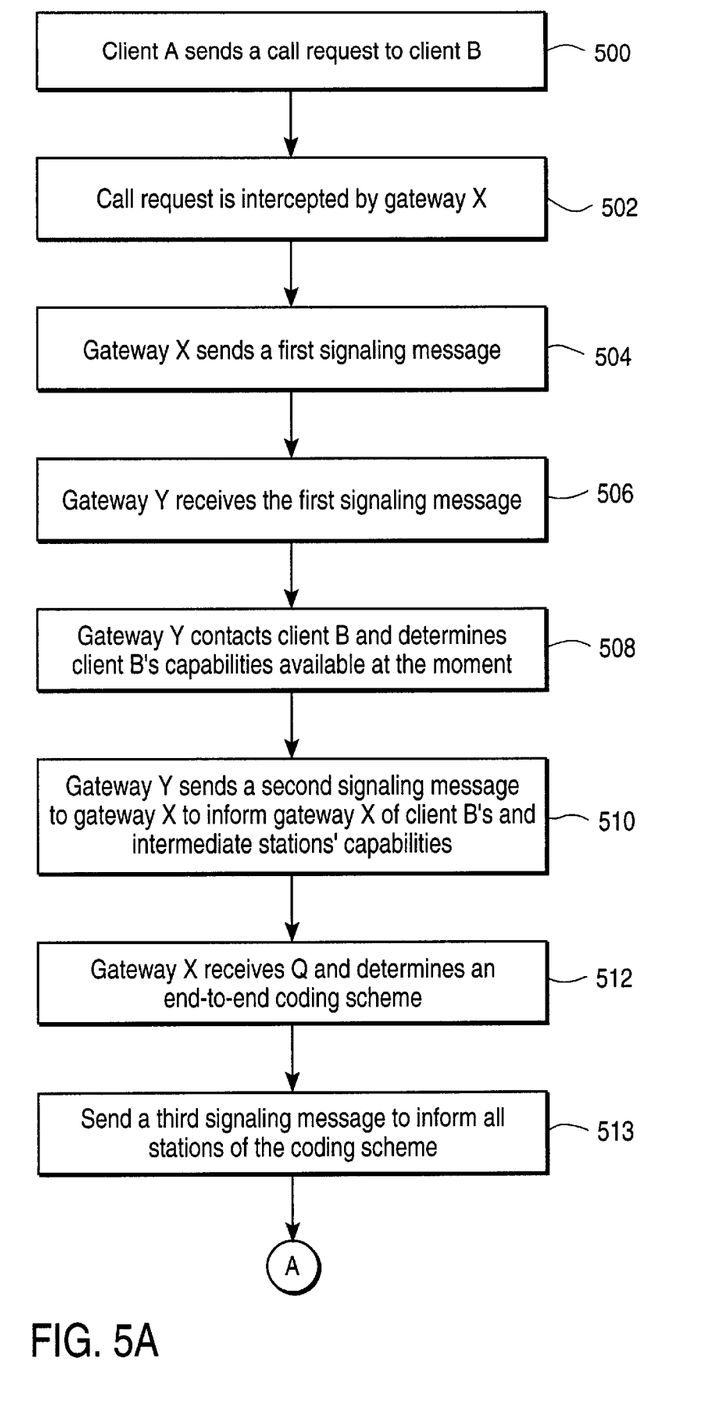
FIGS. 5A–5B illustrate a flow diagram of an example of a method according to an embodiment of the present invention for optimizing telecommunication signal quality in a call between a sender and a receiver.
Figure 5B:
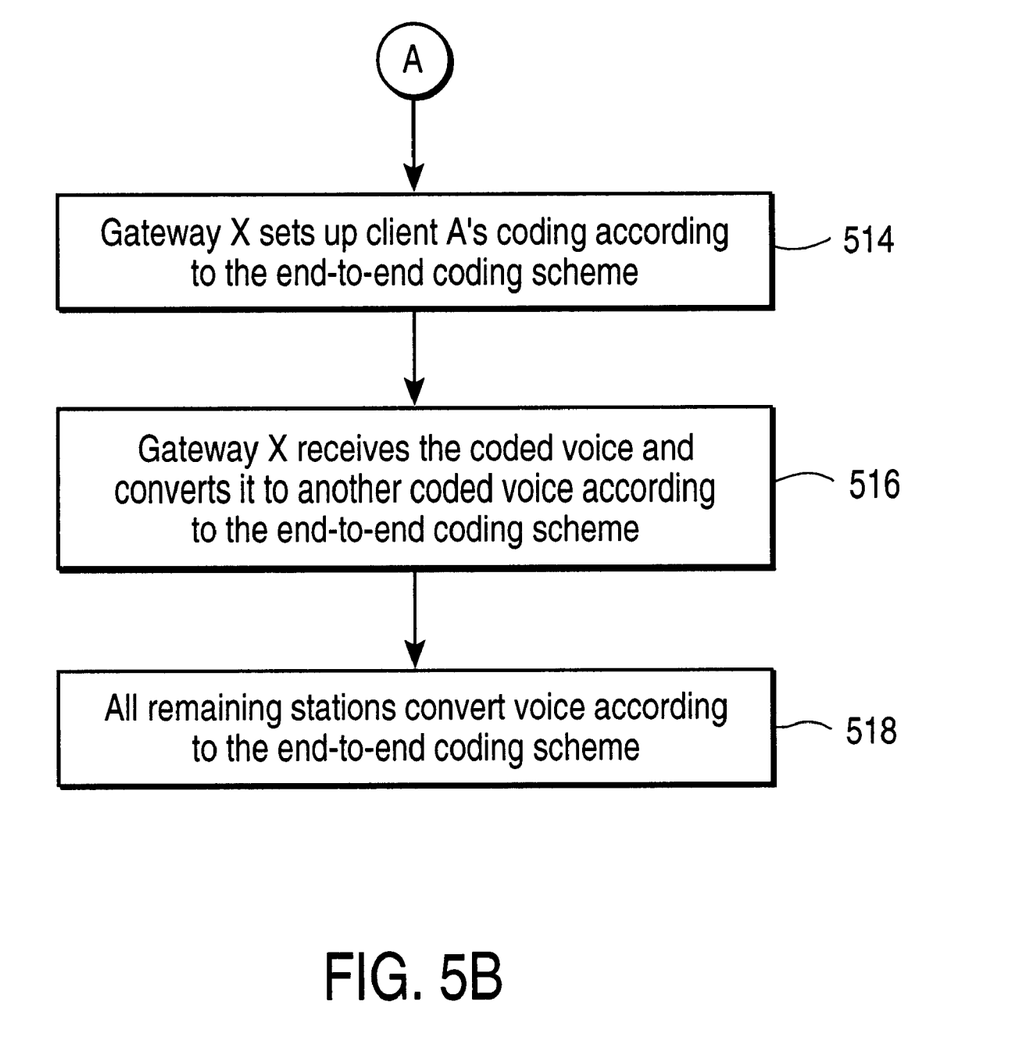

FIGS. 5A–5B show a flow diagram of an example of a method according to an embodiment of the present invention for optimizing telecommunication signal quality, such as voice signal quality, in a call between a sender and a receiver. The example shown in FIGS. 5A–5B may be considered in conjunction with the system diagram shown in FIG. 2.

In this example, client 200 sends a call request to client 210 (step 500). The call request is intercepted by gateway 202 (step 502). Gateway 202 then sends a first signaling message (step 504). The first signaling message may describe coding capabilities of client 200. Alternatively, the first signaling message may simply be sent to collect information regarding coding capabilities of other devices along the call route.

Gateway 208 then receives the first signaling message (step 506). Gateway 208 then contacts client 120 and determines Client's current capabilities (step 508). For example, client 210 may only have GSM capabilities available at the moment.

Gateway 208 then sends a second signaling message to gateway 202 to inform gateway 202 of all stations' capabilities (step 510). In this example, the second signaling message may include a summary of client's and intermediate stations' capabilities. Alternatively, the second signaling message may include an overall coding scheme, such as an end-to-end coding scheme, which is derived approximately at the receiver's location. Receiver's gateway 208 is herein considered to be approximately within the receiver's location, just as sender's gateway 202 is herein considered to be within approximately the sender's location. Another alternative is for the second signaling message to include an overall coding scheme which is derived at an intermediate location between the sender and the receiver. Yet another alternative is for the second signaling message to be the first signaling message with additional information collected regarding the intermediate stations' and the receiver's capabilities.

In this example, gateway 202 then receives the second signaling message and determines an end-to-end coding scheme (step 512). A third signaling message is then sent to inform all stations of the end-to-end coding scheme (step 513).

Gateway 202 sets up client's coding according to the end-to-end coding scheme (step 514). For example, client 200 may be set up with voice coding such as GSM. Gateway 202 then receives the coded voice and converts it to another voice coding according to the end-to-end coding scheme (step 516). For example, GSM may be converted into PCM voice coding at Gateway 202. All remaining stations then convert the received voice according to end-to-end coding scheme (step 518). For example, gateway 208 may receive PCM voice and convert it back to GSM. Gateway 208 then sends GSM voice to client 210.

In this example, the end-to-end compression scheme for the call between client 200 and client 210 of FIG. 2 is optimized. Since the capabilities of client 210 are known from the protocol element that was sent through the ISDN user-to-user signaling field, the coding scheme for client 200 can be set up with the knowledge that GSM is also the coding scheme which is used by client 210. The distortion which was present in the conventional method from a second transcoding at gateway 208 is now absent. Only a minor distortion in the conversion between PCM back to GSM at gateway 208 is introduced since the voice coding is simply going back to its original compression. Distortion has been minimized by allowing only one transcoding caused by the single compression made prior to gateway 202. The conversion back to GSM at gateway 208 is not considered transcoding herein since it is not a new conversion (i.e., a conversion to a coding or compression which has not yet been performed on the signal), but merely a conversion back to GSM. If quality is the only issue, an uncompressed coding could be used instead of compressed coding, but it is typically desirable to balance the need for compression with the minimum sacrifice in quality.

Another example of the method according to an embodiment of the present invention for optimizing telecommunication signal quality, such as voice quality, in a call is when a call utilizes an intermediate network, such as a wide area network composed of a telephony over Internet or intranet connection, using an Internet protocol (IP). In this case, the signaling messages would be delivered as an IP packet, rather than using the ISDN user-to-user signaling packet.

Figure 6A:
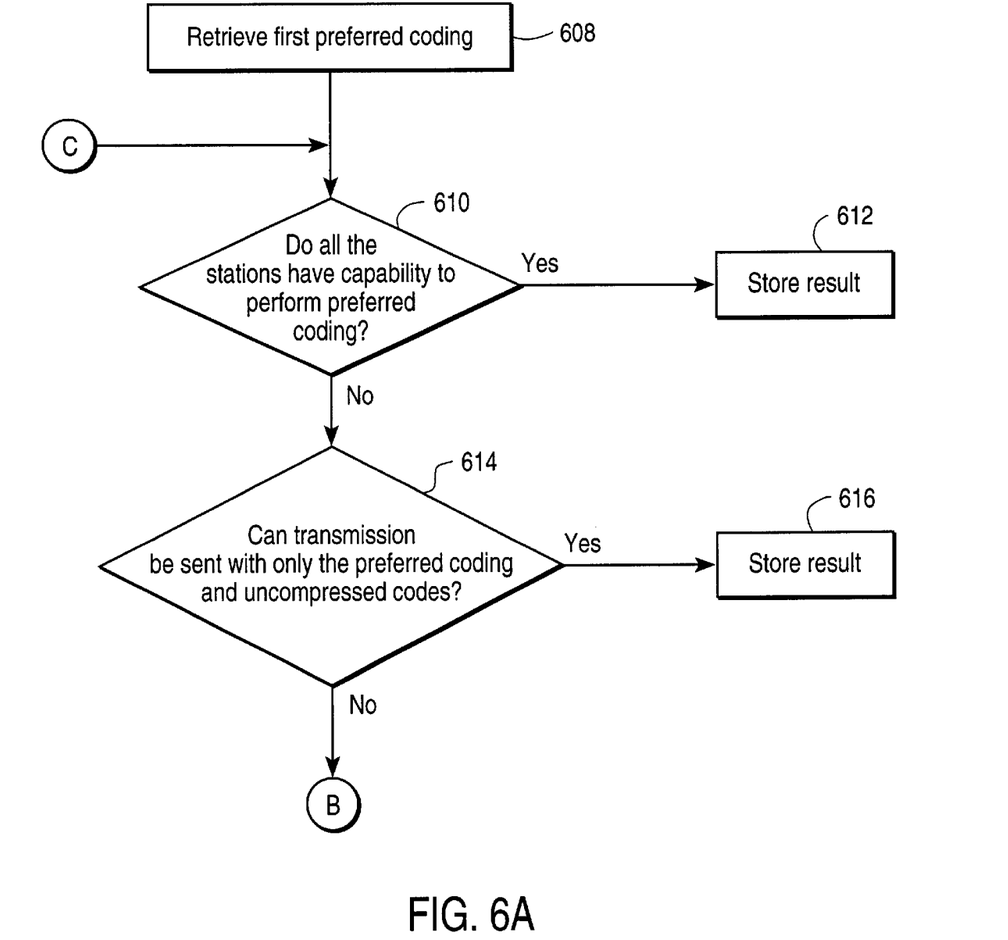
FIGS. 6A–6B is a flow diagram for a method according to an embodiment of the present invention for determining an end-to-end coding scheme.
Figure 6B:
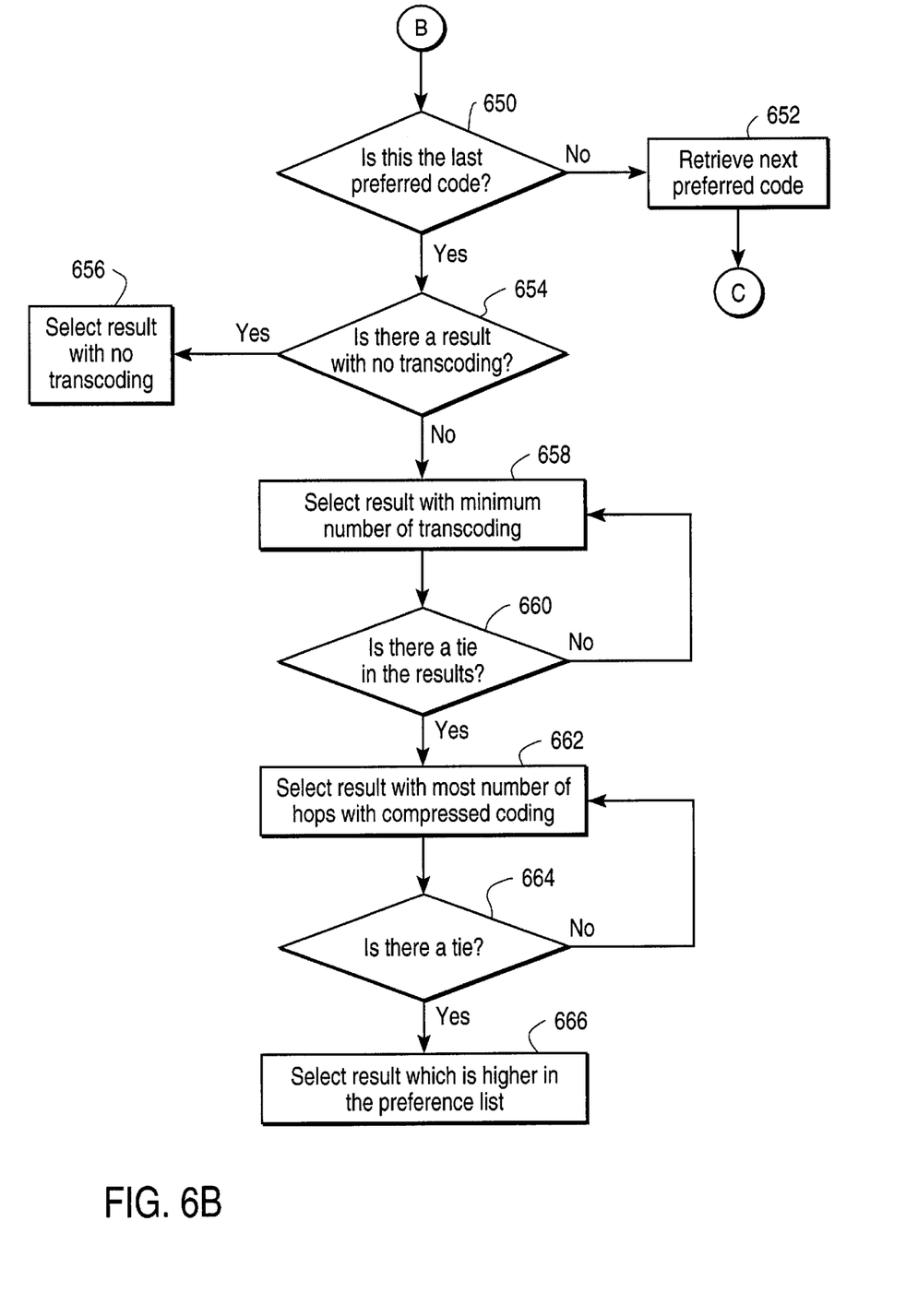

FIGS. 6A–6B show a flow diagram for a method according to an embodiment of the present invention for determining an end-to-end coding scheme. In this embodiment, a list of preferred voice coding methods is maintained by whichever entity is performing the determination of the end-to-end coding scheme. As previously noted, the end-to-end coding scheme may be determined by the sender, the receiver, or any intermediary station.

A first preferred coding method is retrieved from the list of preferred coding methods (step 608). It is then determined whether all the stations have the capability to perform the retrieved preferred coding method (step 610). If all the stations do have the capability to perform the retrieved preferred coding method, then the result is stored (step 612).

If none of the stations have the capability to perform the retrieved preferred coding method (step 610), then it is determined whether the telecommunication transmission can be sent with only the retrieved preferred coding method and uncompressed codes (step 614). Examples of uncompressed codes include PCM and G.711. If the call transmission can be sent with only the retrieved preferred coding method and uncompressed codes, then the result of the determination is stored (step 616).

If the call transmission can not be sent with only the selected preferred coding method and uncompressed codes (step 614), then it is determined whether this retrieved preferred coding method is the last preferred coding method in the sender's list of preferred codes (step 650). If this is not the last preferred coding method, then the next preferred coding method is retrieved (step 652) and it is again determined whether all the stations have the capability to perform the retrieved preferred coding method (step 610).

If, however, this retrieved preferred coding method is the last preferred coding method on the list of preferred coding method (step 650), then the stored results are analyzed and it is determined whether a result exists which allow a transmission of a call with no transcoding (step 654). If there is a result which allows the call to be performed with no transcoding, then that result is selected for the call (step 656). If, however, there is no result which allows the call to be performed without transcoding (step 654) then a result which performs the call with a minimum number of transcodings is selected (step 658).

If there is a tie in the results which allow the call to be performed with a minimum number of transcodings (step 660), then the tied results are analyzed and the result which allows the call to be performed with the most number of hops with compressed coding is selected (step 662). As previously mentioned, a hop is a telecommunication signal coded section between two stations.

If there is another tie with results which allow the call to be made with the most number of hops with compressed coding (step 664), then the tied results are analyzed and the one which is listed higher in the preference list of preferred coding methods is selected (step 666). This final tie can be resolved in various ways. One such way is to organize the sender's preference list in such a manner as to indicate comparative preferences such that a final tie may be broken by selecting a predetermined most preferred option.

The tie breaking methods described in steps 660–666 of FIG. 6B are described in a particular order for exemplary purposes only. Ties may be broken by any user-configurable means and in any order. A further example of a method for breaking a tie in the results is to consider costs of transmission lines (i.e., choose the least expensive transmission line).

A method and system for optimizing telecommunication signal quality, such as voice quality, has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for optimizing telecommunication signal quality for a signal transmitted from a sending station to a receiving station via at least one intermediary station, the method comprising:

sending a signaling message, distinct from said signal, that interacts with at least one of said stations;

collecting from at least one station that interacts with the signaling message information about at least one capability of at least one station; and determining a coding scheme dependent on collected information about a capability of a first station and to be used between second and third stations adjacent to each other in the communications pathway wherein the second and third stations are both intermediary stations.

2. The method of claim 1, wherein the signaling message is an integrated services digital network (ISDN) user-to-user signal.

3. The method of claim 1, wherein the signaling message is an integrated services digital network (ISDN) network signaling message.

4. The method of claim 1, wherein the signaling message is associated with an Internet protocol (IP) packet.

5. The method of claim 1, wherein the at least one capability is a telecommunication signal coding capability.

6. The method of claim 1, wherein the at least one station is an intermediary station.

7. The method of claim 1, wherein the at least one station is the receiving location.

8. The method of claim 1, wherein the determined coding scheme is an end-to-end coding scheme.

9. The method of claim 1, wherein the determined coding scheme is a compression scheme.

10. The method of claim 1, wherein the determined coding scheme is a scheme requiring a minimum number of transcodings.

11. The method of claim 1, further comprising a step of sending the collected at least one capability to an originator of the signaling message.

12. The method of claim 1, wherein the step of determining includes a substep of determining whether the at least one capability matches with a preferred coding.

13. The method of claim 1, wherein the step of determining includes a substep of determining whether the coding scheme may include only a preferred coding and codes which are uncompressed.

14. The method of claim 1, wherein the step of determining includes a substep of determining whether the coding scheme does not include any transcoding.

15. The method of claim 1, wherein the step of determining includes a substep of selecting the coding scheme with a maximum number of hops with compressed coding, if there is a tie in a first and second coding scheme.

16. The method of claim 1, wherein the step of determining includes a substep of selecting the coding scheme which includes a higher level preferred coding, if there is a tie in a first and second coding scheme.

17. The method of claim 1, wherein the telecommunication signal is a voice signal.

18. The method of claim 1, wherein the telecommunication signal is a modem signal.

19. The method of claim 1, wherein the telecommunication signal is a fax signal.

20. The method of claim 1, further comprising communicating the coding scheme to the at least one station.

21. The method of claim 20, wherein the coding scheme is communicated to the at least one station through a second signaling message.

22. A system for optimizing telecommunication signal quality for a signal transmitted from a sending station to a receiving station via at least one intermediary station, the system comprising:

means for sending a signaling message, distinct from said signal, that interacts with at least one of said stations;

means for collecting from at least one station that interacts with the signaling message information about at least one capability of at least one station; and means for determining a coding scheme dependent on collected information about a capability of a first station and to be used between second and third stations adjacent to each other in the communications pathway wherein the second and third stations are both intermediary stations.

23. The system of claim 22, wherein the determined coding scheme is an end-to-end coding scheme.

24. The system of claim 22, wherein the determined coding scheme is a scheme requiring a minimum number of transcodings.

25. A system for optimizing telecommunication signal quality for a signal transmitted from a sending station to a receiving station via at least one intermediary station, the system comprising:

a telecommunication device configured to send a signaling message, distinct from said signal, that interacts with at least one of said stations, the signaling message collecting from at least one station that interacts with the signaling message information about at least one capability of at least one station; and a processor coupled with the telecommunication device configured to determine a coding scheme dependent on collected information about a capability of a first station and to be used between second and third stations adjacent to each other in the communications pathway wherein the second and third stations are both intermediary stations.

26. The system of claim 25, wherein the determined coding scheme is an end-to-end coding scheme.

27. The system of claim 25, wherein the determined coding scheme is a scheme requiring a minimum number of transcodings.

28. The system of claim 25, wherein the signaling message is an integrated services digital network (ISDN) user-to-user signal.

29. The system of claim 25, wherein the signaling message is an integrated services digital network (ISDN) network signaling message.

30. The system of claim 25, wherein the signaling message is associated with an Internet protocol (IP) packet.

31. A computer program product for optimizing telecommunication signal quality for a signal transmitted from a sending station to a receiving station via at least one intermediary station, the computer program comprising:

computer code collecting from at least one station information about at least one capability of at least one station;

computer code determining a coding scheme dependent on collected information about a capability of a first station and to be used between second and third stations adjacent to each other in the communication pathway wherein the second and third stations are both intermediary stations; and a computer readable medium that stores the computer codes.

32. The computer program product of claim 31, wherein the computer readable medium is selected from the group consisting of CD-ROM, floppy disk, tape, flash memory, system memory, hard drive, and data signal embodied in a carrier wave.

33. A method for optimizing telecommunication signal quality for a signal transmitted from a sending station to a receiving station via at least one intermediary station, the method comprising:

sending a signaling message, distinct from said signal, that interacts with at least one of said stations;

collecting from at least one station that interacts with the signaling message information about at least one capability of at least one station; and determining a coding scheme dependent on collected information about a capability of a first station and to be used between second and third stations adjacent to each other in the communications pathway, including selecting a coding scheme that maximizes number of hops with compressed coding within the communications pathway.

34. A system for optimizing telecommunication signal quality for a signal transmitted from a sending station to a receiving station via at least one intermediary station, the system comprising:

a telecommunication device configured to collect via a message from at least one station information about at least one capability of at least one station; and a processor coupled with the telecommunication device configured to determine a coding scheme dependent on collected information about a capability of a first station and to be used between second and third stations adjacent to each other in the communications pathway wherein the coding scheme increases number of hops with compressed coding within the communications pathway as compared to other possible coding schemes.

* * * * *